May 24, 1932.  H. W. CLARK  1,860,317

SHEARS

Filed Dec. 27, 1929

INVENTOR
Harold W. Clark
by his attorneys
Byrnes, Stebbins, Parmelee & Blenko

Patented May 24, 1932

1,860,317

UNITED STATES PATENT OFFICE

HAROLD W. CLARK, OF ALLIANCE, OHIO, ASSIGNOR TO THE ALLIANCE MANUFACTURING COMPANY, OF ALLIANCE, OHIO, A CORPORATION OF OHIO

SHEARS

Application filed December 27, 1929. Serial No. 416,789.

My invention relates to shears and, particularly, to a portable shear for cutting grass and the like.

The objects of my invention are to provide a portable shear which is light in weight, simple in construction, and inexpensive to manufacture. The invention also contemplates the arrangement of the parts so that they lie within a small compass, whereby the shear is useful in places which are inaccessible to larger shears or the standard type of mower.

According to the invention, the shear comprises a frame secured to an operating handle. Movable shear blades are pivoted to the frame so as to be oscillatable into cutting relation. A supporting wheel is journaled in the frame, and provides means for moving the shear along the ground. One face of the wheel is provided with a cam surface. A link connected to the movable blades carries a roller for cooperation with the cam surface so that, upon rotation of the supporting wheel, the link is moved back and forth to oscillate the shear blades. The handle of the shear is of sufficient length to permit the manipulation thereof by the operator without stooping.

The invention will be more fully understood from a consideration of the following description thereof which refers to the following drawings.

Figure 1:
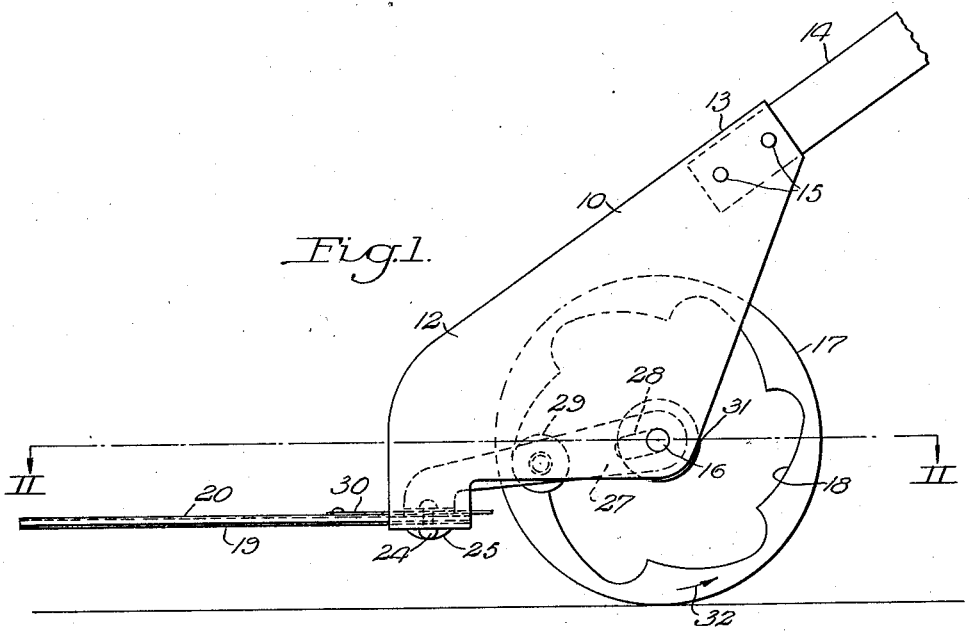
Figure 1 is a side elevation of the shear.
Figure 2:
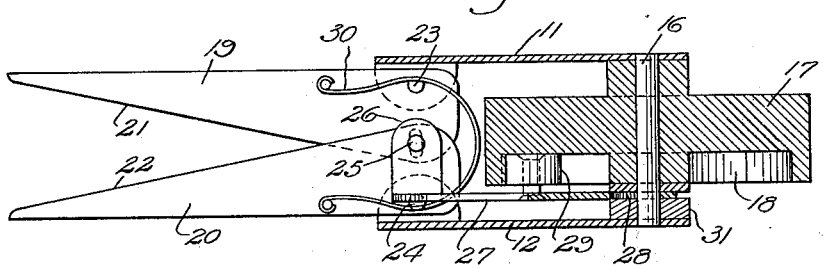
Figure 2 is a sectional view thereof along the plane of line II—II of Figure 1.

Referring specifically to the drawings, the shear comprises a frame 10 formed of side members 11 and 12. At their upper ends, the side members 11 and 12 cooperate to form a socket 13 for an operating handle 14, which is pinned thereto by pins 15. The frame 10 carries a shaft 16 on which a wheel 17 is rotatably mounted. The wheel 17 is provided with a cam recess 18 on one face thereof. Movable shear blades 19 and 20, having cutting edges 21 and 22, are pivoted to the side members 11 and 12, respectively, at 23 and 24. The pivoted ends of the blades 19 have overlapping portions and are slotted for the reception of a rivet 25. The rivet 25 also passes through a horizontal lug 26 on a reciprocating link 27. The link 27 has a slot 28 for receiving the shaft 16. A cam roller 29 is rotatably secured to the link in such position that it cooperates with the cam recess 18 in the wheel 17. A spring 30 serves to urge the blades 19 and 20 toward their open position, as illustrated in Figure 2. A spacing washer 31 is placed between the link 27 and the side member 12 of the frame 10. The side members 11 and 12 are slightly flexible to permit lateral movement of the pivots 23 and 24 as the blades are closed. The wheel 17 may be provided with corrugations around its periphery to prevent it from slipping along the surface of the ground.

In operation, the shear is adapted to be rolled along the ground on the wheel 17. As the wheel 17 rotates in the direction of the arrow 32, the cam surface 18 of the wheel cooperates with the roller 29 to force the link 27 rearwardly. This movement of the link draws the rivet 25 back and causes the cutting edges 21 and 22 of the blades 19 and 20 to engage each other and cut the material therebetween. As the high point of the cam surface of the wheel passes the roller, the latter is drawn forward, together with the link 27, and the blades 16 and 20 are separated by the action of the spring 30.

It will be obvious, from the foregoing description, that the shear is simple in construction and not likely to require repair or renewal of parts since none of the elements is subject to excessive wear. A positive force is exerted on the blades to close them and shear the material therebetween.

Although I have described and illustrated only a single present preferred embodiment of the invention, it is not my intention to be limited to the specific details thereof, since the invention may be practiced in forms other than that shown. For this reason, any changes that fall within the spirit of the invention may be made without departing from the scope of the appended claims.

I claim:

1. A portable shear comprising a frame, cooperating blades pivotally secured to said frame for oscillation to and from cutting relation, a shaft in said frame, a wheel journaled thereon having a cam recess on one face, a single straight link engaging said blades and having a slot traversed by said shaft, and a roller on said link between said shaft and blades for cooperating with said recess to oscillate the blades.

2. A portable shear including a frame, blades pivoted thereto for movement into cutting position, a wheel rotatable in said frame for supporting the shear and having a cam recess therein, a single straight link for actuating said blades and means on said link at substantially the mid portion thereof for engaging said recess.

In testimony whereof I have hereunto set my hand.

HAROLD W. CLARK.